United States Patent [19]

Towson, Jr.

[11] 3,998,035
[45] Dec. 21, 1976

[54] POD COMBINE

[75] Inventor: Arthur L. Towson, Jr., Lewiston, N.Y.

[73] Assignee: Chisholm-Ryder Co., Inc., Niagara Falls, N.Y.

[22] Filed: May 16, 1975

[21] Appl. No.: 578,089

[52] U.S. Cl. .............................. 56/13.5; 56/12.8; 56/130; 130/30 H
[51] Int. Cl.² .................................. A01D 45/24
[58] Field of Search ............ 198/36, 42, 213, 217; 56/13.5, 126–130, 11.9, 14.6; 130/30 E, 30 F, 30 G, 30 H, 30 R

[56] References Cited
UNITED STATES PATENTS

| | | | |
|---|---|---|---|
| 2,608,973 | 9/1952 | Coons | 130/30 R |
| 2,768,628 | 10/1956 | Hermanson | 130/30 H |
| 3,589,111 | 6/1971 | Gullickson | 56/12.8 |
| 3,705,483 | 12/1972 | Jarrell | 56/13.5 |
| 3,709,231 | 1/1973 | Looker et al. | 130/30 H |
| 3,769,988 | 11/1973 | Burenga | 130/30 H |
| 3,771,531 | 11/1973 | Scribner | 130/30 H |

Primary Examiner—Russell R. Kinsey
Attorney, Agent, or Firm—Stanley J. Price, Jr.; John M. Adams

[57] ABSTRACT

A pod combine includes a harvester and a thresher mounted in tandem on a self-propelled mobile frame. The harvester removes the unopened pods and a portion of the foliage from the plants. An inclined endless belt conveyor transports the harvested material through a cluster breaker assembly that picks up clusters of the foliage and product, individualizes the crop and returns it in even distribution to the endless conveyor. A suction fan is positioned rearwardly of the cluster breaker assembly and separates a portion of the foliage from the crop before the crop is conveyed to a product feed apparatus that conveys the harvested material to the thresher. The thresher includes a foraminous reel arranged to be driven in preselected, opposite direction and an axially positioned impeller having a plurality of beaters secured thereto. A product collecting device is positioned below the foraminous reel. The shelled product is conveyed by the product collecting device to a separator device operable to separate the foliage from the shelled product.

10 Claims, 8 Drawing Figures

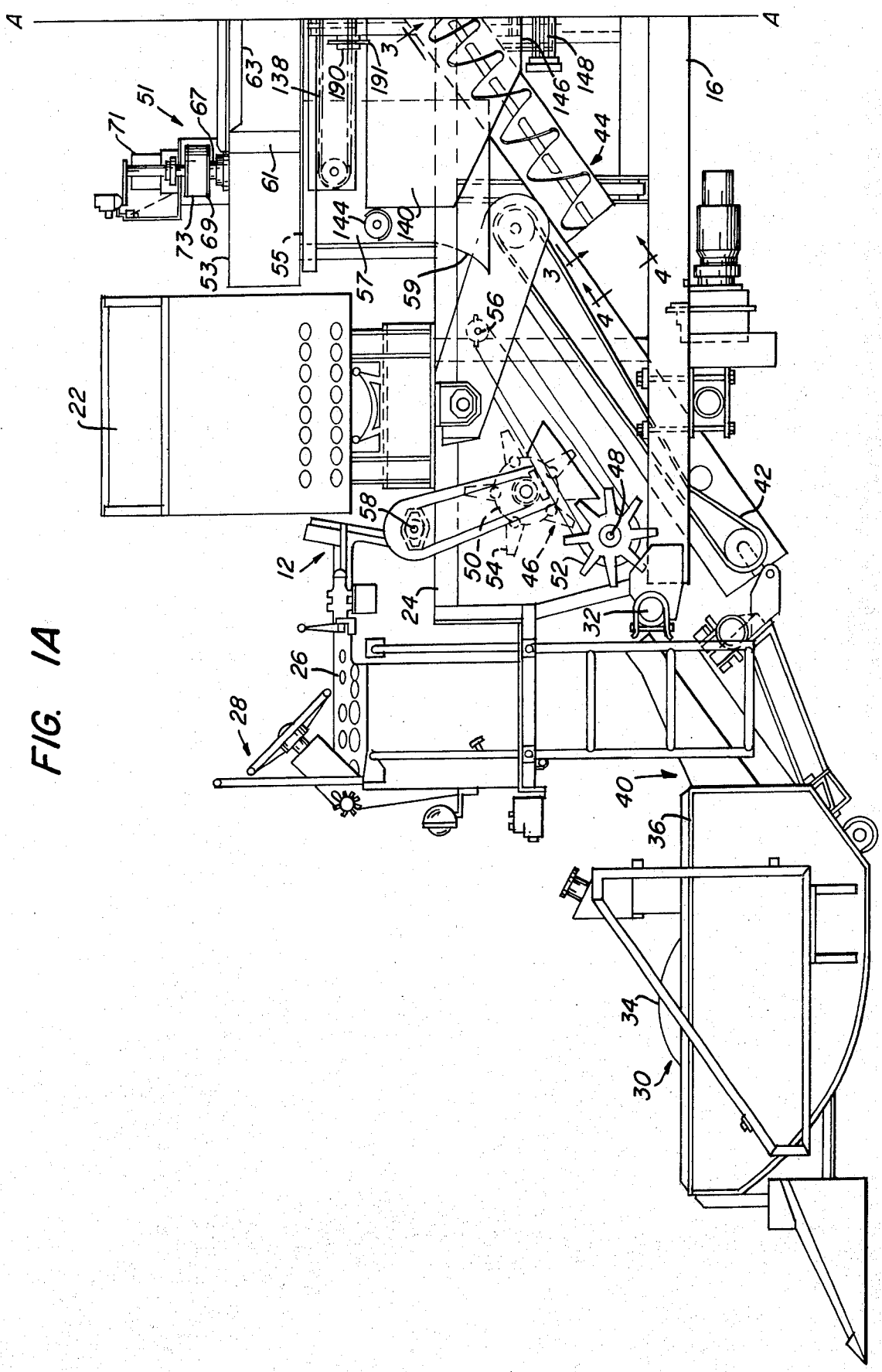

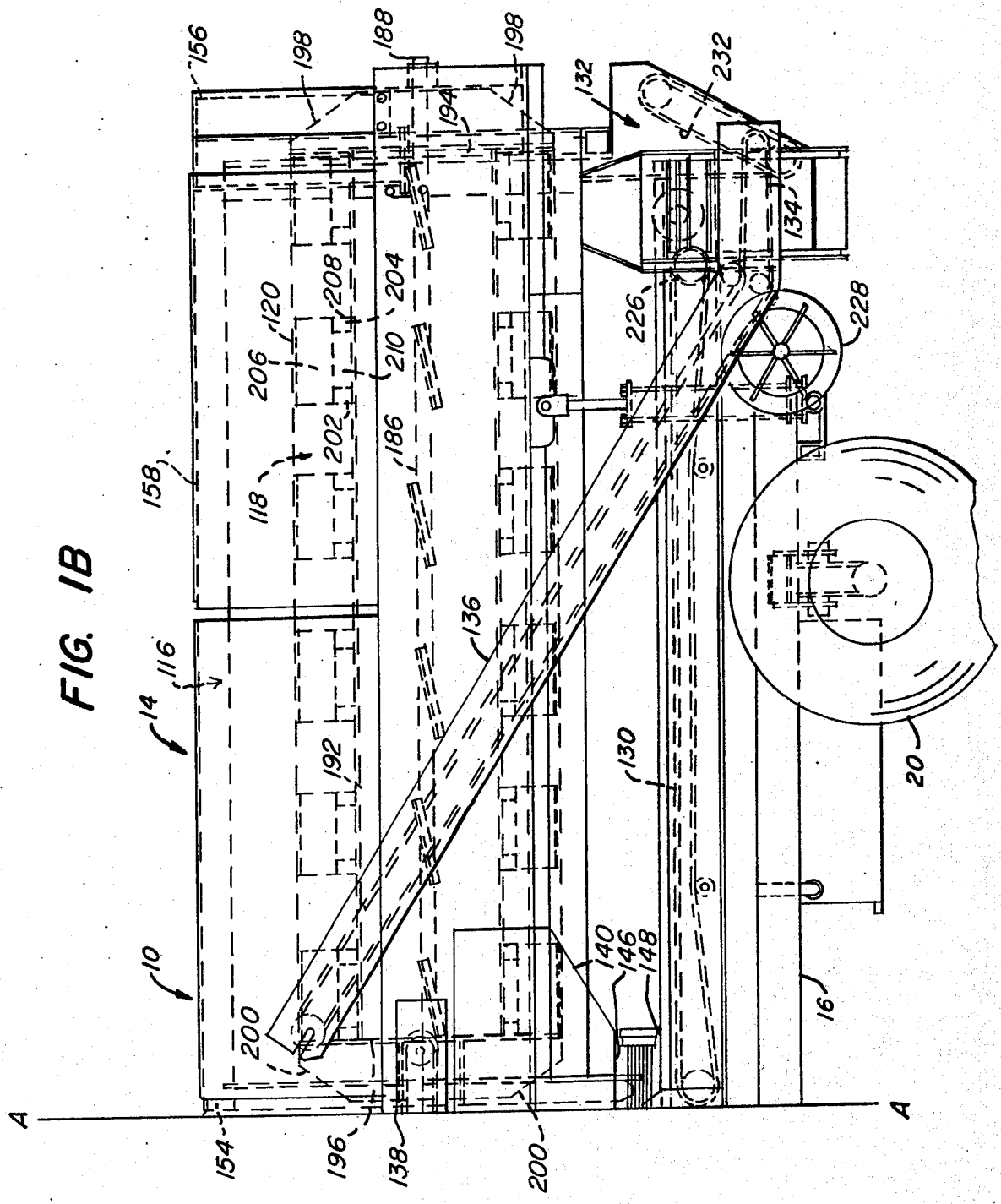

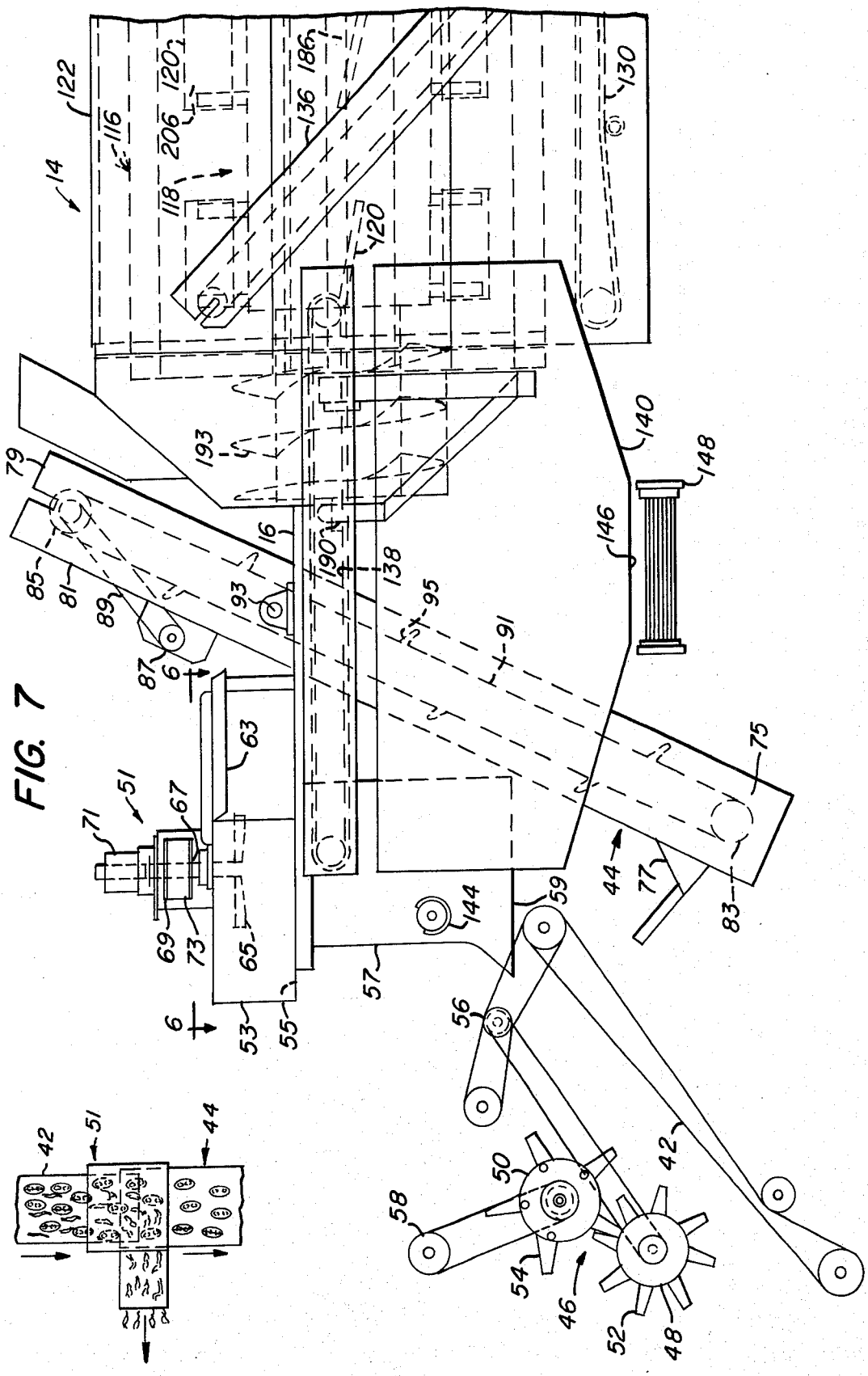

POD COMBINE

BACKGROUND OF THE INVENTION

1. Field of the Invention

This invention relates to a pod combine and more particularly to a pod combine that includes a portable harvester and a thresher where the percentage of shellable product that is introduced into the thresher is substantially increased by the operation of a cluster breaker assembly and suction fan device.

2. Description of the Prior Art

U.S. Pat. No. 3,705,483, entitled "Multi-Row Multi-Crop Harvester" discloses a self-propelled harvesting machine for harvesting different types of crops, such as snap beans, lima beans, peas, dry beans, and the like. The harvester is arranged to strip the foliage and product in the pod from the plants, leaving a substantial portion of the vines still rooted in the ground. The pods and extraneous foliage are deposited in a receiver and transported to a processing station where the product in the pods and the extraneous foliage are introduced into a thresher or a viner, similar to that disclosed in U.S. Pat. No. 2,768,628, entitled "Viner". In the fixed viner or threshing device, the pods are opened and the product, peas, beans, lima beans, soy beans, and the like, is separated from the pod and extraneous foliage.

U.S. Pat. No. 3,769,988 discloses a legume harvester with an auger feed that harvests the leguminous crop and conveys the leguminous crop and extraneous vines and foliage by means of a rotating auger, into a threshing device where the pods are opened and the shelled crop collected in a receiver.

Copending United States patent application, Ser. No. 477,202 discloses a pod combine that includes a harvester and thresher mounted in tandem on a self-propelled mobile frame. The harvester strips the unopened pods and a portion of the foliage and vines from the plants which remain rooted in the ground. A twin screw feed device feeds the harvested material to the thresher. The thresher includes a foraminous reel and an axially positioned impeller having beaters that minimize convection currents within the thresher. A product collecting device is positioned below the reel, and a separator device is arranged to separate the foliage from the shelled product fed by the product collecting device. When the stripped pods are fed into the thresher, they are mixed with foliage. The greater the percentage of foliage in the mixture, the less the percentage of product that is separated from the mixture. The waste materials tend to impede the passage of the shelled product through the foraminous reel. Therefore, there is need for separating a substantial portion of the foliage from the podded product prior to introducing the mixture of foliage and podded product into the thresher. In this manner the percentage of shellable product that is introduced into the thresher may be substantially increased as may the efficiency of the thresher in separating the shelled product from the foliage and other extraneous material.

SUMMARY OF THE INVENTION

In accordance with the present invention, there is provided a pod combine for harvesting the edible product of leguminous plants that includes both a harvester and a thresher mounted in tandem on a movable frame. The harvester is arranged to remove the unopened pods and a portion of the foliage and vines from the plants. The thresher is arranged to open the pods and remove the product therefrom and separate the product from substantially all of the pods, vines and foliage. A product feed apparatus is provided for feeding the material harvested by the harvester into the rotating reel portion of the thresher. Segregating means are positioned rearwardly of the harvester and in overlying relation with the product feed apparatus on the frame for breaking up clusters of the foliage and product and separating a substantial portion of the foliage from the product before the product and the remaining portion of the foliage are introduced into the product feed apparatus.

A separator assembly is positioned on the frame, rearwardly of the thresher and is operable to separate a minor portion of the foliage discharged from the rotatable reel from the product removed from the pods by the thresher. A first conveyor is positioned longitudinally beneath the rotatable reel and conveys the product and foliage discharged through the rotatable reel to the separator assembly. A second conveyor conveys the product from a separator to a storage means.

The segregating means includes a cluster breaker assembly and a suction device. The cluster breaker assembly picks up clusters of the foliage and product and acts upon the clusters to separate and distribute the product on an endless belt positioned below the cluster breaker assembly. The suction device separates a substantial portion of the foliage from the product as the product is being conveyed to the product feed apparatus. The cluster breaker assembly is positioned above and extends transversely of an endless belt conveyor that conveys the product and foliage from the harvester to the product feed apparatus. The cluster breaker assembly includes a pair of interacting rotors that are operable to pick up clusters of the product and foliage and thereby separate the clusters by macerating the clusters so that the product is individualized and falls back onto the surface of the endless belt conveyor in an even distribution. The suction device combines with the macerating action of the cluster breaker assembly to separate a substantial portion of the foliage from the product before being introduced into the thresher. The lighter weight foliage is drawn upwardly into an inlet duct of the suction device and is discharged therefrom onto the ground. The heavier product remains on the endless belt conveyor and is fed to the product feed apparatus. With this arrangement, the percentage of the shellable product fed into the thresher is substantially increased.

The thresher includes a reel rotatably mounted on pairs of drive wheels to permit the reel to rotate in either direction. A housing surrounds the reel and a longitudinal end conveyor is positioned beneath the reel. The thresher includes a plurality of longitudinally extending ribs that have a vertical wall portion and inclined wall portion. The reel rotates in one direction to impinge certain types of pods on the vertical portion of the ribs and in the opposite direction to impinge tender products, such as peas, on the inclined portion of the ribs to thereby minimize damage to the product during the shelling operation. A simple impeller is positioned axially within the thresher reel and is arranged to rotate at preselected speeds. The impeller includes a plurality of radially extending beaters or vanes arranged to convey the material introduced into the reel into the discharge portion of the reel.

Accordingly, the principal object of the present invention is to provide a pod combine for harvesting the edible product of leguminous plants that includes an improved feeding device for conveying the harvested product to the thresher.

Another object of the present invention is to provide a pod combine having a segregating device for breaking up clusters of foliage and product and separating a substantial portion of the foliage from the product to thereby increase the percentage of the shellable product introduced into the thresher.

A further object of the present invention is to provide a cluster breaker assembly positioned between the harvester and the thresher for picking up clusters of foliage and product and acting upon the clusters to evenly distribute the foliage and product onto a product feed apparatus that conveys the product into the thresher reel.

An additional object of the present invention is to provide a suction fan device in combination with the cluster breaker assembly that is operable to separate a substantial portion of the macerated foliage and product evenly distributed on an endless belt conveyor by the cluster breaker assembly before the product is being conveyed to the product feed apparatus.

A still further object of the present invention is to provide a thresher that efficiently separates the product from the pods.

These and other objects of the present invention will be more completely described and disclosed in the following specification, the accompanying drawings and the appended claims.

BRIEF DESCRIPTION OF THE DRAWINGS

FIG. 1A is a view, in side elevation, of the front portion of the pod combine.

FIG. 1B is a view, in side elevation, of the rear portion of the pod combine.

FIG. 6 is a fragmentary top plan view of the suction fan illustrated in FIG. 1A, showing the conveyor for feeding the foliage and crop to the suction fan and a belt conveyor for transporting the product with a portion of the foliage removed to the viner.

FIG. 7 is a fragmentary view, in side elevation, of another embodiment of the present invention, illustrating an inclined elevating conveyor for transporting the product, with a portion of the foliage removed by the suction fan, into the viner and a screw conveyor for feeding the material into the rotatable reel.

DESCRIPTION OF THE PREFERRED EMBODIMENTS

Figure 2:
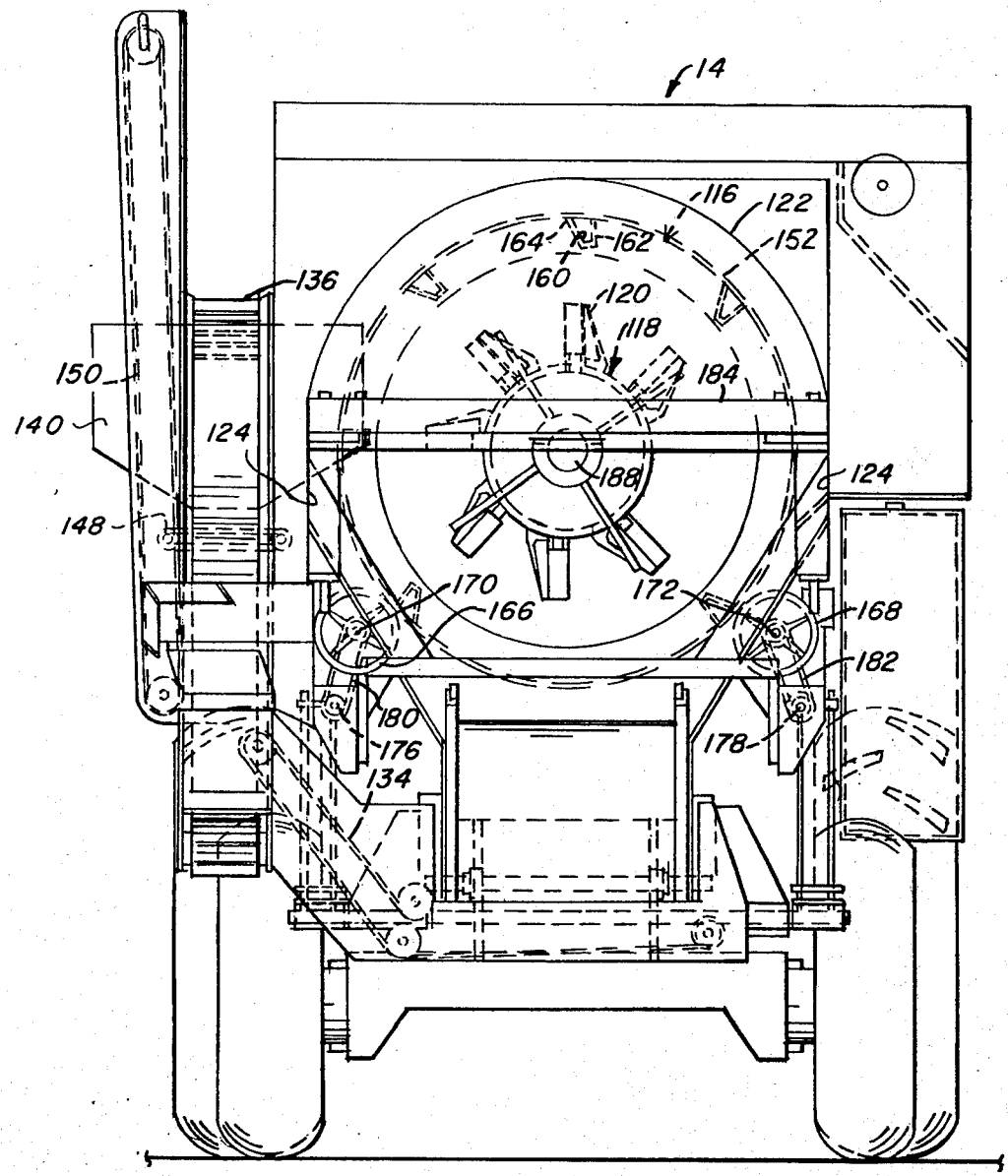
FIG. 2 is a view, in end elevation, of the discharge end portion of the combine illustrated in FIG. 1B.

Referring to the drawings, and particularly to FIGS. 1A, 1B and 7, there is illustrated a combine, generally designated by the numeral 10 that includes a harvester portion 12 and a viner or thresher portion 14. The harvester and thresher portions are mounted on a main frame 16 which is, in turn, mounted on a pair of front propelling wheels (not shown) and a pair of rear wheels 20. A suitable engine 22 is mounted above the propelling wheels of a frame member 24 and is arranged to propel the combine 10 and to supply fluid, under pressure, to the hydraulic drive motors for the driven components of the combine 10. A driver's platform 26 is also mounted on the frame 24 in front of the engine 22. Suitable steering apparatus 28 is provided to steer the combine during the harvesting and threshing operation.

The harvester portion 12 of the combine 10 is similar to that illustrated and described in U.S. Pat. No. 3,705,483, entitled "Multi-Row, Multi-Crop Harvester", assigned to the assignee of the instant application and will not be described in detail. The disclosure of U.S. Pat. No. 3,705,483 is incorporated herein by reference.

The harvester 12 includes a picker mechanism generally designated by the numeral 30 that is secured to a transverse bar 32 mounted on the front end of main frame 16. The picker mechanism 30 is preferably connected to the front end portion of main frame 16 to permit it to change its elevation and follow undulations in the ground over which the combine 10 travels during the harvesting of the crops. The picker mechanism 30 includes tined reel 34 mounted transversely in the picker mechanism forwardly extending housing 36. Suitable drive means are provided for rotating the tined reel 34 in a direction to lay the plants rearwardly over a plant engaging roller (not shown) and onto the upper surface of the transverse plate positioned beneath the tined reel 34 and forming a part of the housing 36. The tined reel 34 is arranged to strip the foliage and crop from the plants without uprooting, to any great extend, all of the plant stems. The picker mechanism 30 has a trough 40 extending rearwardly from the housing 36 on which the stripped foliage and crop are conveyed toward the main frame 16. Within the trough 40, there may be provided an endless conveyor to transport the material to a second endless conveyor 42. The crop is dumped on the second endless conveyor 42 and conveyed upwardly thereon toward the product feed apparatus, generally designated by the numeral 44 and illustrated in detail in FIGS. 3, 4, 5 and 7.

While the stripped foliage and crop are conveyed on conveyor 42, the crop is acted upon by a cluster breaker assembly, generally designated by the numeral 46. The cluster breaker assembly 46 includes a front rotor 48 and a rear rotor 50 with rotors 48 and 50 being positioned above the upper flight of endless conveyor belt 42 and extending transversely thereacross. The rotor 48 has blade-like arms 52 which are spaced circumferentially therearound. The rotor 50 has blade-like arms 54 spaced circumferentially therearound and arranged to penetrate the spaces between the arms 52 of rotor 48. The rotor 48 is arranged to pick up clusters of crop from the upper reach of the endless conveyor 42 and carry the clusters upwardly toward the descending arms 54 of rotor 50. Drive means, such as a hydraulic motor, generally designated by the numerals 56 and 58, rotate the rotors 48 and 50 in timed relation with each other. The coordinated rotation of rotors 48 and 50 develops a shearing or macerating action between the arms 52 and 54, that segregates the clusters and individualizes the crop on the upper reach of endless conveyor 42.

With the foliage and product substantially separated and distributed on the endless belt conveyor 42 by the macerating action of the cluster breaker assembly 46, a suction device, generally designated by the numeral 51 is positioned on the main frame 16 adjacent the endless conveyor 42 above the discharge end portion thereof. The suction device 51 separates at least a portion of the macerated foliage from the crop before the crop is introduced into the product feed apparatus 44. In this manner, the percentage of shellable crop that is introduced into the product feed apparatus 44 is substantially increased, thereby reducing the percentage of foliage that must later be separated from the crop in the viner 14.

The suction device or fan 51 includes a housing 53 having an open bottom portion 55 with an inlet duct 57 depending downwardly therefrom. The inlet duct 57 has a lower end flared portion 49 that is positioned adjacent the endless conveyor 42 and in material receiving relationship therewith. The housing 53 also includes a side outlet 61 that is connected to a discharge duct 63 that projects outwardly from the top of the main frame 16. A vertically downwardly extending lower portion (not shown) may be secured to the discharge duct 63 for discharging the separated foliage upon the ground under the harvester.

As illustrated in FIG. 7, an impeller 65 is rotatably supported by a shaft 67 within the housing 53 above the open bottom portion 55. The impeller 65 is secured to the end portion of the shaft 67 that extends upwardly through the housing 53 and is rotatably supported thereon. A driven pulley 69 is secured to the upper end portion of the shaft 67 for rotation therewith. A hydraulic motor 71 is mounted on the housing 53, laterally of the shaft 67. The motor 71 includes an output shaft (not shown) having a drive pulley secured thereto. An endless belt 73 connects the motor drive pulley to the driven pulley 69. In this manner, operation of the hydraulic motor 71 transmits rotation to the shaft 67 through the endless belt 73 and driven pulley 69 to rotate the impeller 65.

Rotation of the impeller 65 creates a suction force within the housing 53 and the inlet duct 57. The suction force or reduced pressure created within the inlet duct 57 is sufficient to withdraw from the endless belt 42, a portion of the macerated foliage distributed thereon upwardly into the flared end portion 59. Thus, the heavier product, with a substantial portion of the foliage removed therefrom, remains on the conveyor 42 for discharge upon the product feed apparatus 44.

Through the combined effects of the cluster breaker assembly 46 and the suction device 51, a substantial portion of the foliage, which would otherwise be directed to the product feed apparatus 44, is separated from the product. Thus, the concentration of the shellable product in the material that is delivered to the product feed apparatus 44 and thereafter to the viner 14, is substantially increased.

Figure 3:
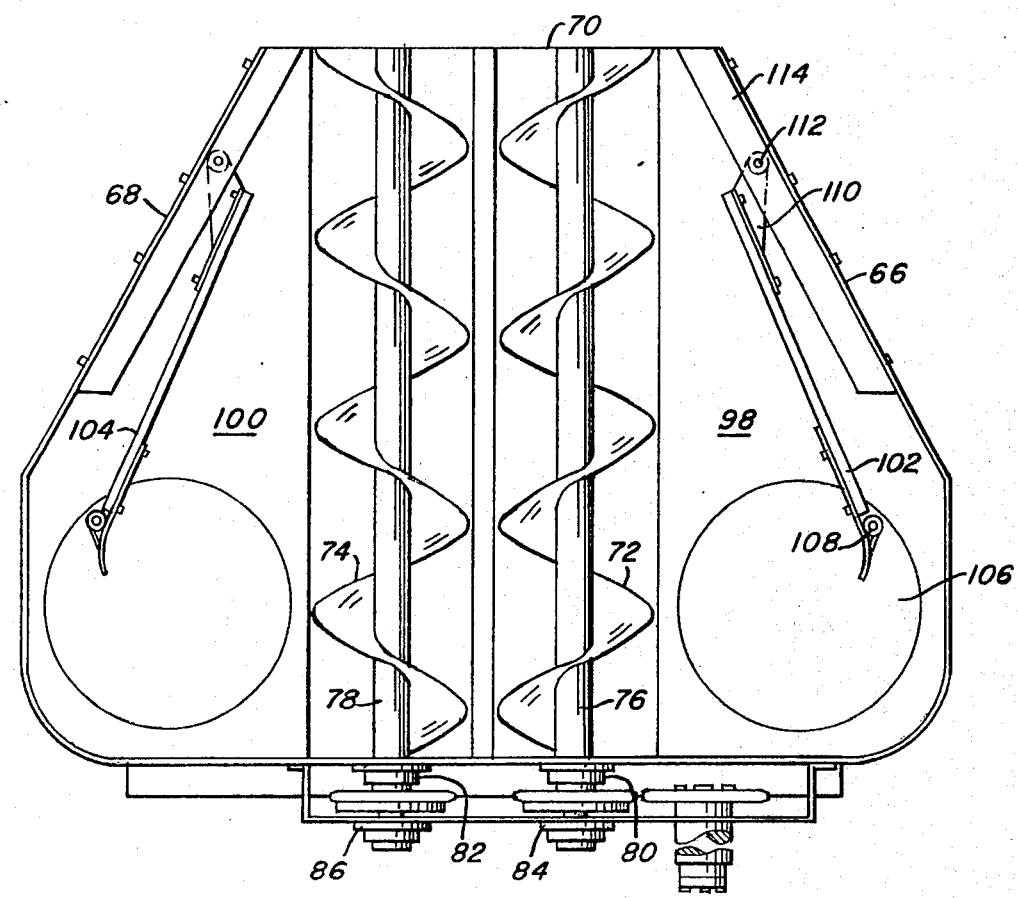
FIG. 3 is a fragmentary view of the crop feeding apparatus, taken along the line 3—3 of FIG. 1A.
Figure 4:
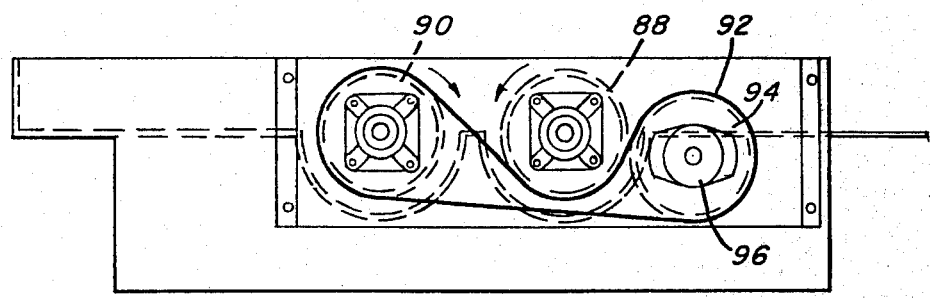
FIG. 4 is a fragmentary view, in end elevation, of the front end of the crop feeding apparatus, taken along the line 4—4 of FIG. 1A and illustrated in FIG. 3.
Figure 5:
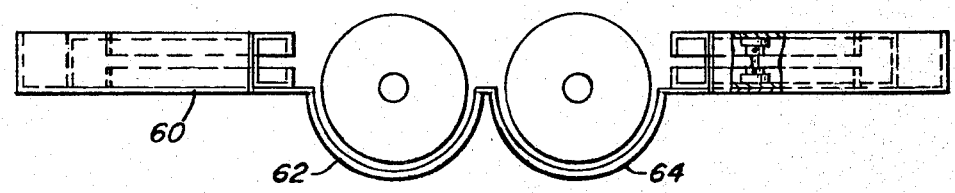
FIG. 5 is a view, in end elevation, of the other end portion of the crop feeding apparatus.

The crop is deposited from the discharge end portion of the conveyor 42 to the product feed apparatus 44, illustrated in FIGS. 3, 4 and 5. The product feed apparatus 44 is arranged to convey the product and extraneous foliage to the inlet end portion of the viner or thresher 14. The diameter of the inlet opening into the cylindrical portion of the viner reel is substantially less than the transverse dimension of the endless conveyor 42, so that the speed at which the product is transported from the endless conveyor 42 to the inlet portion of the viner must be increased to prevent an accumulation of the product in front of the viner inlet opening. The product feed apparatus has a base plate portion 60 with a pair of longitudinally extending semicircular recessed portions 62 and 64. In top plan, as illustrated in FIG. 3, the base portion 60 has a generally triangular appearance with side portions 66 and 68 converging toward the outlet end portion 70 of the product feed apparatus 44.

A pair of screw-type conveyors 72 and 74 are positioned in the trough-like recesses 62 and 64. The screw-type conveyors 72 and 74 have shafts 76 and 78 with end portions 80 and 82 suitably mounted in bearings 84 and 86. Sprockets 88 and 90 are secured to the respective shafts 76 and 78 and have a chain 92 reeved therearound in a manner that the endless screw conveyors 72 and 74 rotate in timed relation in the direction illustrated in FIG. 4. The chain 92 is reeved around a sprocket 94 secured to a hydraulic motor 96. Thus, the motor 96, upon actuation, rotates the screw conveyors 72 and 74 in the direction illustrated in FIG. 4, and rapidly conveys the product, foliage and vines remaining intermixed therewith upwardly into the inlet portion of the viner at a preselected speed.

The endless conveyor 42 has a transverse dimension substantially wider than the two screw conveyors 72 and 74 and portions of the product from the conveyor 42 are deposited on the surfaces 98 and 100 on opposite sides of the screw conveyors 72 and 74 to a pair of gathering arms 102 and 104, provided to gather the product deposited on the surfaces 98 and 100 and direct the product into the troughs 62 and 64, where the screw conveyors 72 and 74 are effective in conveying the product upwardly into the inlet of the viner. The gathering arms are similar in construction and include a rotatable disc 106 having an end portion 108 of the arm 102 secured thereto adjacent the periphery thereof. The other end of the arm has rearwardly extending plate 110 from which rod 112 depends. The rod 112 is positioned in a channel 114 formed in the base plate 60. Suitable drive means are provided to rotate the disc 106 at a preselected speed. The rotation of disc 106 moves the arm 102 toward and away from the trough 62 in a manner to direct the product toward the trough 62. With this arrangement, conveyor 42 deposits the product on the upper surface of the base plate 60 and the gathering arms 102 and 104 direct the product onto surfaces 98 and 100 toward the screw conveyors 72 and 74. The screw conveyors 72 and 74 then rapidly convey the product into the inlet opening of the viner reel.

Further in accordance with the present invention, another embodiment of the product feed apparatus 44 is illustrated in FIGS. 6 and 7 and includes an inclined elevating conveyor 75 having a material receiving end portion 77 positioned in underlying relationship with the discharge end portion of the endless conveyor 42 and a discharge end portion 79 positioned over the inlet opening of the viner reel. The inclined elevating conveyor 75 includes a pair of laterally spaced inclined plate members 81 that are mounted adjacent the discharge end portion 79 on a shaft 93 that is suitably journaled in a bearing mounted on the main frame 16. A drive roller 85 is rotatably mounted at the discharge end portion 79 between the inclined plate members 81. A driven roller 83 is rotatably mounted at the receiving end portion 77 between the lower end portion of the plate members 81. A suitable hydraulic motor 87 is supported on the inclined plate 81 and is drivingly connected by a belt 89 to the drive roller 85. An endless belt 91 passes around the rollers 83 and 85 and includes transversely positioned cleats 95 that are spaced at intervals on the endless belt 91. With this arrangement, the motor 87, upon actuation, rotates the endless belt 91 in a clockwise direction, so that the crop and foliage remaining intermixed therewith discharged by the endless conveyor 42 is deposited onto the receiving end portion 77 of the inclined elevation conveyor 75.

Referring to FIGS. 1B and 2, the thresher or viner 14 is arranged to remove beans, peas, and the like, from the pods with a rotating reel and an impeller and convey the beans or peas through the foraminous reel onto a conveyor positioned therebelow. The thresher 14 is also referred to as a viner and is similar in many respects to the viner illustrated and described in U.S. Pat. No. 2,768,628, which disclosure is incorporated herein by reference.

The thresher 14 illustrated in FIGS. 1B and 2 includes a cylindrical reel generally designated by the numeral 116 rotatably supported on the main frame 16 and an impeller, generally designated by the numeral 118 positioned within the reel 116. The impeller 118 is separately driven and as later described, has radially extending beaters 120. A housing 122 extends around the reel 116 and has vertical walls 124. The housing 122 may also include a pair of inclined movable sideboards (not shown) that are arranged to oscillate linearly and discharge the product passing through the reel 116 onto an endless conveyor 130 positioned therebeneath. Copending United States patent application, Ser. No. 477,202, entitled "Pod Combine", assigned to the assignee of the instant application, discloses in detail the oscillating sideboards of the housing 122. The details, therefore, of the oscillating sideboards will not be described herein.

The product is deposited upon the endless conveyor 130 and is transported to a foliage separating station, generally designated by the numeral 132. The foliage is separated from the product and the product falls, by gravity, into a transverse endless conveyor 134, where it is conveyed upwardly onto an elevating conveyor 136, illustrated in FIGS. 1B, 2 and 7. The product from the elevating conveyor 136 is deposited onto an elevated longitudinal conveyor 138 and is transported to a hopper 140, as illustrated in FIGS. 1A, 1B 2 and 7. The elevated longitudinal conveyor 138 is preferably a foraminous conveyor through which the product passes and is deposited into the hopper 140. The foliage and product remaining on the upper reach of the conveyor 138 are deposited onto a transverse screw conveyor 144, as illustrated in FIG. 1A. The transverse screw conveyor 144 conveys the product and the foliage to the product feed apparatus 44 where it again is fed into the thresher 14.

As illustrated in FIGS. 1A, 1B and 7, the hopper 140 has a bottom opening 146, with a transverse belt conveyor 148 positioned therebeneath. When it is desired to empty the hopper 140, the transverse belt conveyor 148 is energized to convey the product to the side of the vehicle. An inclined discharge conveyor 150 (illustrated in FIG. 2) is pivoted beneath the transverse conveyor 148 and has a discharge end portion, preferably positioned over a separate receiver for the product. The product is removed from the hopper 140 by the conveyor 148 and discharges onto the conveyor 150. The discharge conveyor 150 then conveys the product to a separate mobile receiver positioned adjacent the combine.

The hopper 140 illustrated in FIGS. 1A, 1B, 2 and 7, is provided with inclined side walls that serve to direct the product onto the transverse belt conveyor 148. The hopper 140, however, may be rectangular in configuration, having a closed bottom portion and pivotally mounted on the main frame 16 for discharging the product from the hopper. with this arrangement, the hopper 140 may be provided with a fluid actuated piston cylinder assembly that is operable, upon actuation, to pivot the hopper 140 on the main frame 16 and discharge the product from the hopper into a separate mobile receiver positioned adjacent the hopper.

Now referring in detail to the reel 116 and the impeller 118, illustrated in FIGS. 1B, 2 and 7, the reel 116 is a generally cylindrical configuration and includes a foraminous wall 157, having apertures of a preselected size. As illustrated in FIG. 1B, the reel 116 has annular end portions 154 and 156 and longitudinal rib members 158 providing a suitable frame for the foraminous wall or screen 152. Secured to the inner portion of the screen 152 are a plurality of inwardly extending ribs 160, each having a vertical side portion 162 and an inclined portion 164. The ribs 160 are positioned equidistantly around the inner surface of the screen 152 and extend radially inwardly toward the impeller 118. The ribs 160 are so arranged that, upon rotation of the reel 116 in a clockwise direction, as viewed in FIG. 2, the product will strike the vertical walls 162 of ribs 160. When the reel is rotated in a counter-clockwise direction, as viewed in FIG. 2, the product will strike the inclined walls 162 of the ribs 160.

When a relatively tender product, such as peas, in being harvested, it is preferable to rotate the reel so that the product in the pods strikes the inclined walls 164 and thus, minimize bruising the shelled product. The reel is rotatably supported at its rear end portion on a pair of driving wheels 166 and 168 that abut the annular end portion 156, as illustrated in FIG. 2. The driving wheels 166 and 168 are mounted on shafts 170 and 172 that extend forwardly along the sides of the housing. Similar pairs of drive wheels are connected to the front ends of the respective shafts 170 and 172 and abut the annular end portion 154, as illustrated in FIG. 1B. The shafts 170 and 172 are driven by pairs of motors 176 and 178 and drive chains 180 and 182. The motors 176 and 178 are preferably fluid driven reversible motors that permit the reel 116 to be rotated in either a clockwise or counter-clockwise direction at a preselected speed.

The impeller or beater 118 is positioned within the reel 116 and supported by frame 184 for independent rotation relative to the reel 116. The impeller has a shaft 186, as illustrated in FIG. 1B, with a rear end portion 188 and a front end portion 190 that are rotatably supported in bearings on the frame 184. The shaft front end portion 190 is drivingly connected to a drive motor 191 (FIG. 1A) by suitable sprockets arrangement so that the impeller 118 rotates in a preselected direction; either the same or opposite to that of the reel 116.

The impeller 118 has a tubular portion 192 secured to the shaft 186 by means of a circular front plate 196 and a circular rear plate 194, as illustrated in FIG. 1B. A plurality of radially extending impeller blades 200 are secured to the front end of the impeller 118 and arranged to propel the product, foliage and vines inwardly into the reel 116. Other impeller blades 198 are secured to the discharge end of the impeller 118 and assist in propelling the vines and foliage out of the reel 116.

As illustrated in FIG. 7, a screw feed conveyor 193 may be secured to the shaft 190. The screw conveyor 193 feeds the foliage and product received from the inclined elevating conveyor 75 into the reel 116.

As illustrated in FIG. 7, a plurality of beaters 120 are secured to the impeller in longitudinal rows along the outer surface of the tube 192. The beaters 120 are arranged in longitudinal rows along the surface of tube 192 and extend radially therefrom. Other rows of beaters 120 are inclined relative to the longitudinal axis of the impeller 118 in a direction to convey the foliage and vines through the reel 116 while the pods are being opened and the product is being discharged through the opening in reel 116.

The product is discharged from the reel 116 in an uneven distribution on the top reach of the endless belt conveyor 130. The product may be discharged in piles on either side portion of the belt conveyor 130 or in a position between the side portions. In a specific embodiment, the product may accumulate in two longitudinal piles that are positioned adjacent the side portions of the belt conveyor 130. The product also contains a small amount of foliage, stems and the like, which must be separated therefrom before the product is deposited into the hopper 140. To separate the foliage and other extraneous material from the product, it is desirable to distribute the product as an even screen by a twin screw conveyor 226 (FIG. 1B) positioned rearwardly and transversely to the conveyor belt 130. With this arrangement, the piles of material on the belt conveyor 130 are evenly distributed by the screw conveyor 226 so that a curtain of product and foliage is discharged from the twin screw conveyors downwardly toward the transverse endless conveyor 134.

The foliage separating station 132 includes a blower 228 that directs a stream of air under pressure against the curtain of product and foliage separated from the twin screw conveyor 226. The velocity of the air is sufficient to pick up and impinge the foliage and vines against the upwardly extending endless conveyor 232 which discharges the impurities from the thresher 14. The product, i.e. beans, or peas, has sufficient weight to fall, by gravity, onto the endless conveyor 134 and be conveyed transversely to the elevating conveyor 136. With this arrangement, the impurities contained with the product are separated therefrom by the air blast from the blower 228 and discharged from the thresher 14 by means of the endless conveyor 232.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:
1. In a pod combine for harvesting the edible product of leguminous plants comprising,
a mobile frame,
a harvester and thresher mounted in tandem on said mobile frame, said thresher including a rotatable reel portion having an inlet end portion,
said harvester operable to remove the unopened pods, a portion of the foliage and vines from the plant, said thresher operable to open said pods and remove the product therefrom and separate said product from substantially all of said pods, vines and foliage,
feed means positioned on said frame between said harvester and said thresher for feeding the material harvester by harvester into said thresher rotatable reel portion,
a segregating assembly including cluster breaking means and suction means positioned rearwardly of said harvester and in overlying relation with said feed means on said frame for breaking up clusters of said foliage and said product and separating a substantial portion of said foliage from said product before said product and the remaining portion of said foliage is introduced into said thresher rotatable reel portion.
separator means for separating a minor portion of said foliage discharged from said rotatable reel from said product removed from said pods by said thresher, said separator means positioned on said frame in material receiving relation with said rotatable reel to receive a minor portion of said foliage and said product discharged from said rotatable reel after said thresher has removed the product from the pods,
first conveying means positioned longitudinally beneath said rotatable reel for conveying said product and said minor portion of said foliage discharged through said rotatable reel to said separator means, and
second conveying means for conveying said product from said separator means to a storage means.

2. A pod combine as set forth in claim 1 in which said feed means includes,
a plate member secured to said frame and positioned between said harvester and said inlet end portion of said harvester reel, said plate member having a pair of trough portions extending longitudinally between said harvester and said inlet end portion of said thresher reel,
a pair of screw-type conveyors positioned in said pair of longitudinally extending trough portions,
an endless belt conveyor secured to said frame and positioned between said harvester and said screw conveyors for conveying the material harvested by said harvester to said screw conveyor, and
means drivingly connected to said screw conveyors for rotating said screw conveyors in timed relation to convey said material discharged by said endless belt conveyor into said inlet end portion of said thresher.

3. A pod combine as set forth in claim 2 which includes,
said endless belt conveyor arranged to discharge said material harvested by said harvester onto said plate member top surface, and
feed means positioned on said plate member for moving said material deposited on said plate member towards said pair of longitudinally extending trough portions.

4. A pod combine as set forther in claim 3 in which said feed means includes,
a pair of circular disc members forming a portion of said plate member top surface, each of said disc members positioned on opposite sides of said pair of longitudinally extending through portions,
a pair of arm members each secured at one end to said disc members adjacent the peripheral edge thereof, means slidably supporting the other end portion of said arm members on said plate members, and drive means secured to said frame and connected to said disc members for rotating said disc members to move portions of said arm members toward and away from said pair of longitudinal trough portions to, in turn, move said material deposited on said plate member top surface toward said pair of longitudinally extending trough portions.

5. A pod combine as set forth in claim 1 in which said feed means includes, an inclined elevating conveyor supported on said frame rearwardly of said harvester and in underlying relationship with said suction means, said inclined elevating conveyor including a pair of laterally spaced inclined plate members positioned forwardly of said rotatable reel on said frame, an endless belt rotatably supported at the end portion of said plate members, said endless belt having a receiving end portion positioned in underlying relationship with said suction means and a discharge end portion positioned above said inlet end portion of said rotatable reel, a plurality of transversely positioned cleat members secured at spaced intervals on said endless belt, and drive means for rotating said endless belt in a preselected direction to discharge from said belt discharging end portion into said rotatable reel inlet end portion said product and remaining portion of said foliage deposited onto said receiving end portion of said endless belt conveyor.

6. A pod combine as set forth in claim 1 which includes, said cluster breaking means positioned above and extending transversely of said endless belt conveyor for picking up clusters of said foliage and said product to act upon said clusters to separate and distribute said product and foliage on said endless belt conveyor, and said suction means positioned rearwardly of said cluster breaking means on said frame for separating a substantial portion of said foliage from said product as said product is being conveyed by said feed means to said rotatable reel.

7. A pod combine as set forth in claim 1 in which said thresher reel includes a cylindrical foraminous wall, a pair of annular end ring members, a pair of drive shafts supported adjacent and extending longitudinally in opposite sides of said thresher reel, wheel members mounted on both of said drive shafts in abutting relation with said ring members, and means drivingly connected to said drive shaft for rotating said drive shaft to thereby rotate said reel through said wheel members in either a clockwise or counter-clockwise direction.

8. A pod combine as set forth in claim 7 in which, said reel includes a plurality of longitudinally extending rib member secured to the inner surface of said cylindrical foraminous wall, said rib members extending radially inwardly toward the axis of said reel, said rib members positioned in spaced relationship to each other on the inner surface of said cylindrical foraminous wall, said rib members having a longitudinally extending vertical wall and a longitudinally extending inclined wall, said rib members arranged upon rotation in a preselected direction to strike said material conveyed to said reel by either said vertical wall or said inclined wall of said rib members depending upon the direction of rotation of said reel.

9. A pod combine as set forth in claim 1 which includes, said second conveying means including a transverse conveyor positioned on said frame beneath the discharge end of said first conveying means and an elevating conveyor arranged to receive said product from said transverse conveyor and to convey said product to said storage means, an upwardly extending endless conveyor positioned adjacent said separator means, and said separator means including an air blast device positioned above said transverse conveyor, said air blast means arranged to separate by gravity said product from said foliage and impinge said separated foliage against said upwardly extending endless conveyor with said product arranged to fall by gravity on said transverse conveyor for delivery to said elevating conveyor and therefrom to said storage means.

10. A pod combine as set forth in claim 9 which includes, product distributor means rotatably supported on said frame and positioned rearwardly and transversely to said first conveying means for evenly distributing said material discharged from said first conveying means in a curtain of said material into the path of said air blast device.

* * * * *